(12) United States Patent
Aikyo et al.

(10) Patent No.: US 7,379,389 B2
(45) Date of Patent: May 27, 2008

(54) APPARATUS FOR MONITORING SURROUNDINGS OF VEHICLE AND SENSOR UNIT

(75) Inventors: Hideyuki Aikyo, Kariya (JP); Hiroshi Touge, Ichinomiya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/525,910

(22) Filed: Sep. 25, 2006

(65) Prior Publication Data
US 2007/0076526 A1  Apr. 5, 2007

(30) Foreign Application Priority Data
Sep. 30, 2005  (JP)  ............................. 2005-287495

(51) Int. Cl.
*G01S 3/80* (2006.01)
(52) U.S. Cl. .......................... 367/128; 367/96
(58) Field of Classification Search ................ 367/128, 367/96
See application file for complete search history.

(56) References Cited

U.S. PATENT DOCUMENTS

| | | | | |
|---|---|---|---|---|
| 4,199,246 A | * | 4/1980 | Muggli | ......................... 367/96 |
| 4,435,055 A | * | 3/1984 | Berdat et al. | .................. 367/96 |
| 7,166,832 B2 | * | 1/2007 | Takenaka | ..................... 250/221 |
| 2006/0006316 A1 | * | 1/2006 | Takenaka | ..................... 250/221 |
| 2007/0076526 A1 | * | 4/2007 | Aikyo et al. | ................. 367/128 |

FOREIGN PATENT DOCUMENTS

| | | |
|---|---|---|
| JP | 2001-208843 A | 8/2001 |
| JP | 2004-026012 A | 1/2004 |
| JP | 2004-230993 A | 8/2004 |

* cited by examiner

*Primary Examiner*—Dan Pihulic
(74) *Attorney, Agent, or Firm*—Sughrue Mion, PLLC (57) ABSTRACT

An apparatus for monitoring surroundings of a vehicle includes an imaging apparatus provided at the vehicle, a plurality of ultrasonic sensors provided around the imaging apparatus as a unit with the imaging apparatus, an object-position-detecting apparatus for detecting a position of an object appearing within an imaging range of the imaging apparatus on the basis of outputs of the plurality of the ultrasonic sensors and a display-controlling apparatus for performing a predetermined image processing for an image obtained by the imaging apparatus at a position corresponding to the position of the object detected by the object-position-detecting apparatus.

13 Claims, 10 Drawing Sheets

Outline of estimated locus of vehicle

FIG. 9B

Outline of estimated locus of vehicle

FIG. 10A

FIG. 10B

APPARATUS FOR MONITORING SURROUNDINGS OF VEHICLE AND SENSOR UNIT

CROSS REFERENCE TO RELATED APPLICATIONS

This application is based on and claims priority under 35 U.S.C. § 119 to Japanese Patent Application 2005-287495, filed on Sep. 30, 2005, the entire content of which is incorporated herein by reference.

FIELD OF THE INVENTION

This invention generally relates to an apparatus for monitoring surroundings of a vehicle and a sensor unit. More specifically, this invention pertains to an apparatus for monitoring surroundings of a vehicle for emphatically displaying an object included in an image of surroundings of the vehicle and a sensor unit for the apparatus for monitoring surroundings of the vehicle.

BACKGROUND

A technique for displaying information on circumstances of surroundings of an automotive in order to assist a driver in parking, or the like, so that a collision of a corner portion of a vehicle with another obstacle can be inhibited, is conventionally known. For example, JP2004-026012A (Patent document 1) discloses an apparatus for monitoring surroundings of a vehicle. In the apparatus for monitoring surroundings of the vehicle, a camera and an ultrasonic sensor, or the like, are made as a unit. In a situation where an obstacle is detected by the ultrasonic sensor, an image, which corresponds to the obstacle and which is obtained by the camera, is displayed in a display of a navigation system installed in the vehicle.

According to the Patent Document 1, in a situation where an obstacle is detected, the apparatus for monitoring surroundings of the vehicle merely displays an image obtained by the camera, which can obtain the image of the obstacle. Accordingly, a driver need to judge where an object that should be focused, such as an obstacle, is present in the displayed image. Therefore, there can be a situation where an obstacle is difficult to be recognized or grasped. Further, there can be a situation where a degree of helpfulness of information becomes thereby low.

A need thus exists for an apparatus for monitoring surroundings of a vehicle, which displays an obstacle, or the like, so that the obstacle can be easily recognized and thereby which can provide helpful information to a driver. The present invention has been made in view of the above circumstances and provides such an apparatus for monitoring surroundings of a vehicle.

SUMMARY OF THE INVENTION

According to an aspect of the present invention, an apparatus for monitoring surroundings of a vehicle includes an imaging means provided at the vehicle, a plurality of ultrasonic sensors provided around the imaging means as a unit with the imaging means, an object-position-detecting means for detecting a position of an object appearing within an imaging range of the imaging means on the basis of outputs of the plurality of the ultrasonic sensors and a display-controlling means for performing a predetermined image processing for an image obtained by the imaging means at a position corresponding to the position of the object detected by the object-position-detecting means.

BRIEF DESCRIPTION OF THE DRAWINGS

The foregoing and additional features and characteristics of the present invention will become more apparent from the following detailed description considered with reference to the accompanying drawings, wherein:

FIGS. 1A to 1C represent diagrams for explaining a configuration of a sensor unit according to embodiments of the present invention.

DETAILED DESCRIPTION

Figure 4:
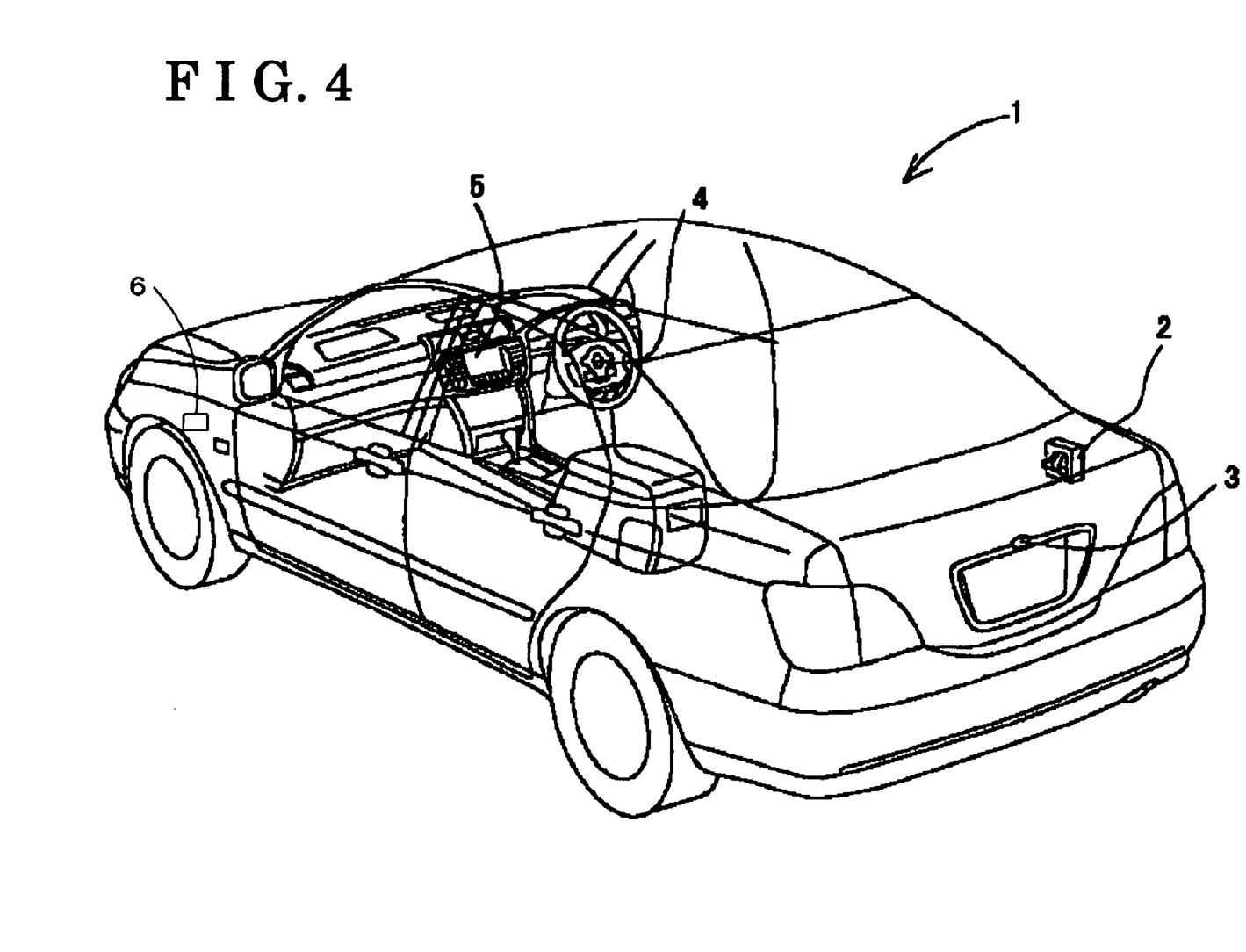
FIG. 4 represents a diagram for explaining a configuration of a vehicle.

A first embodiment of the present invention will be explained with reference to drawing figures. An apparatus for monitoring surroundings of a vehicle according to the embodiment of the present invention is, as illustrated in FIG. 4, located at a vehicle 1. The apparatus for monitoring surroundings of the vehicle includes a control apparatus 2, a sensor unit 3, a steering angle sensor 4, a display apparatus 5 and a vehicle speed sensor 6, or the like.

The sensor unit 3 is configured so that a camera and an ultrasonic sensor are provided as a unit. The sensor unit 3 is provided at a garnish portion of a license plate provided at a part of rearward of the vehicle, for example, a trunk hood, or the like, As illustrated in a plane view of FIG. 1A, a camera 31 (lens) is located at a center of the sensor unit 3. Ultrasonic sensors 32, 33 and 34 and a temperature sensor 35 are located around the camera 31. Here, the ultrasonic sensors 32, 33 and 34 serve as first, second and third ultrasonic sensors (ultrasonic wave receiving elements) respectively.

Figure 1A:
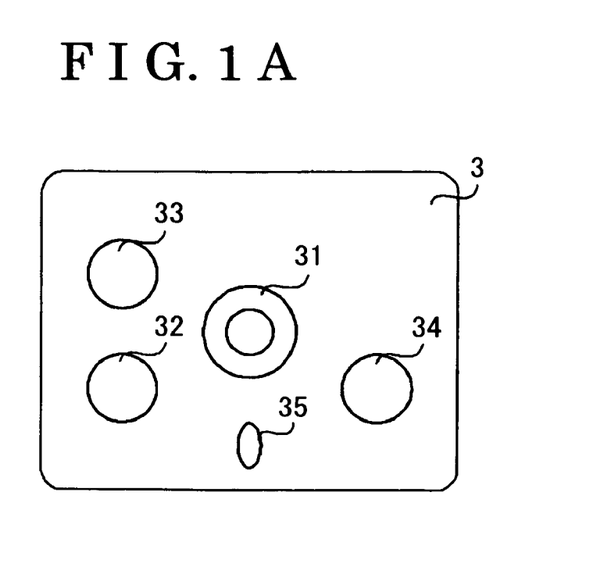
FIG. 1A represents a plane view illustrating a whole sensor unit.
Figure 1B:
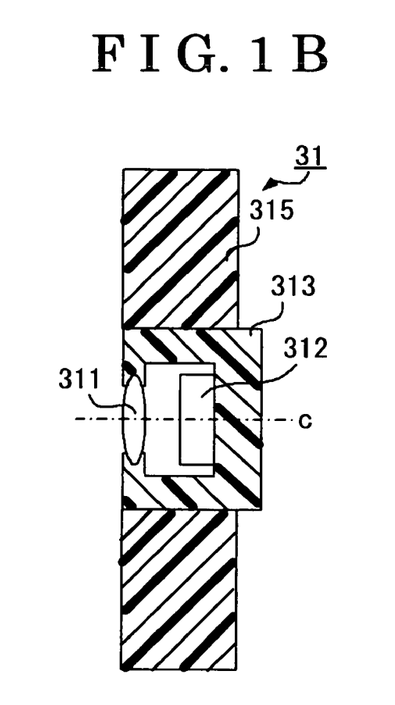
FIG. 1B represents a cross-sectional view of a camera.

As illustrated in a cross-sectional view of FIG. 1B, the camera 31 includes an optical unit 311 which includes a super-wide-angle lens, or the like, an imaging element 312, such as a charge coupled device (CCD) element, and a housing 313, or the like. The camera 31 is fixed to a plate 315 of the sensor unit 3. The camera 31 obtains an image in an imaging range from a moving direction of the vehicle 1 (in this case, backward direction). The image obtained by the camera 31 is supplied to the control apparatus 2. In the meantime, an image outputted to the control apparatus 2 is inversed so that the image is displayed in the display apparatus 5 as same as a rearward image that is seen by a rearview mirror.

Figure 1C:
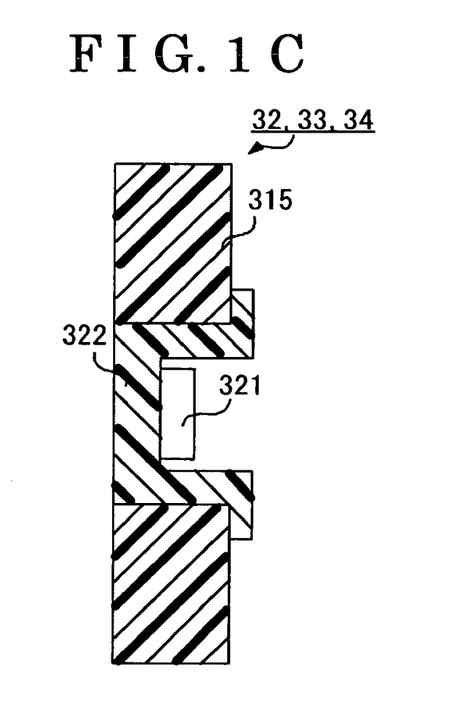
FIG. 1C represents a cross-sectional view of an ultrasonic sensor.

The ultrasonic sensor 32 has both functions of an ultrasonic wave transmitting element and the ultrasonic wave receiving element. Specifically, as illustrated in a cross-sectional view of FIG. 1C, the ultrasonic sensor 32 includes a piezoelectric element 321, a cover 322, or the like. Applying pulsed high frequency waves to the piezoelectric element 321 oscillates the ultrasonic sensor 32. The ultrasonic sensor 32 transmits ultrasonic waves through the cover 322, which functions as a resonator, On the other hand, in a situation where ultrasonic waves are received by the ultrasonic sensor 32 through the cover 322, which functions as the resonator, pressure, which corresponds to the ultrasonic waves, is applied to the piezoelectric element 321 and the piezoelectric element 321 induces electromotive force. By detecting the electromotive force, reception of the ultrasonic waves can be detected.

The ultrasonic sensors 33 and 34 are dedicated receivers of ultrasonic waves. The ultrasonic sensors 33 and 34 have a configuration illustrated in FIG. 1C. However, the ultrasonic sensors 33 and 34 do not have a configuration for supplying high frequency signal to the piezoelectric element 321.

The ultrasonic sensors 32 to 34 are located as a unit around an optical axis (center of view) C of the lens 311 of the camera 31 (optical unit) so as to surround the optical axis. Reflected waves of ultrasonic waves, transmitted from the ultrasonic sensor 32 and reflected by an obstacle, are received by the ultrasonic sensors 32 to 34. In FIGS. 1A, an intersection of a perpendicular line extended from a middle point of a line, which connects centers of the ultrasonic sensors 32 and 33, and a perpendicular line extended from a middle point of a line, which connects centers of the ultrasonic sensors 32 and 34, corresponds to the optical axis C.

The temperature sensor 35 measures a temperature of ambient air for determining propagation speed of ultrasonic waves.

Figure 2A:
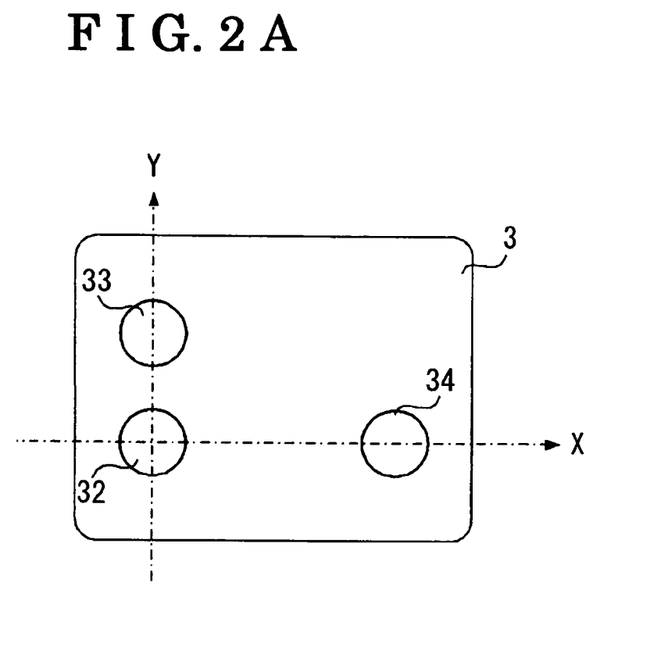
FIG. 2A represents a diagram illustrating a location of the ultrasonic sensor located at the sensor unit illustrated in FIG. 1A.
Figure 2B:
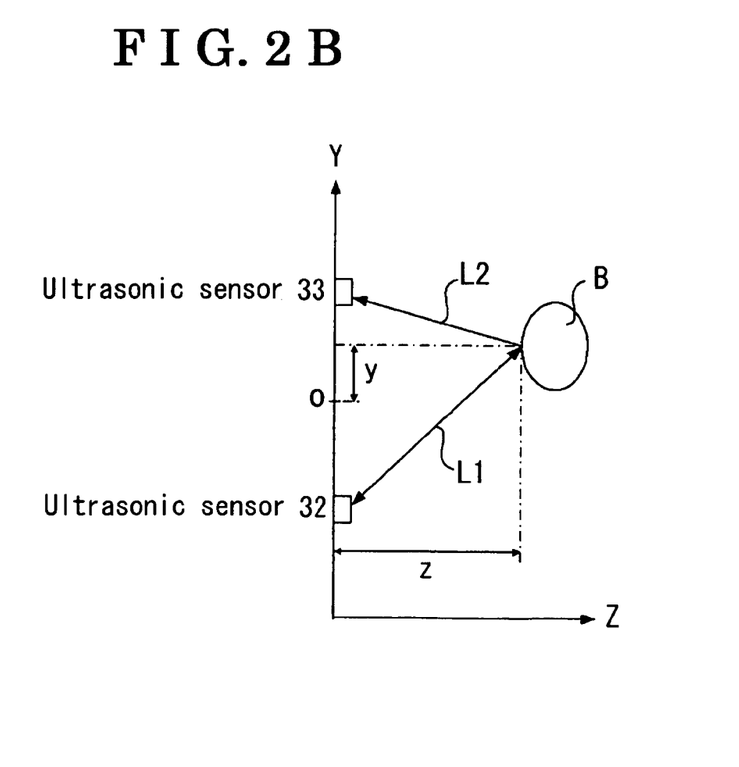
FIG. 2B represents a diagram for explaining a method for measuring a distance to an object.

As illustrated in FIG. 2A, the ultrasonic sensor 32 and the ultrasonic sensor 33 are arranged in a vertical direction. A position at the middle point between the ultrasonic sensor 32 and the ultrasonic sensor 33 corresponds to a height of the camera 31. As schematically illustrated in FIG. 2B, by measuring a period of time until reflected waves of the ultrasonic waves transmitted from the ultrasonic sensor 32 and reflected by an object B is received by the ultrasonic sensor 33, a position y in Y-axis direction (coordinate value) and a position z (distance) in Z-axis direction of the object B can be determined just like triangular surveying
, More specifically, the following equations are fulfilled.

$$L1 = C \cdot T1/2$$

$$L2 = C \cdot T2 - L1$$

L1: Distance between the ultrasonic sensor 32 and the object B

L2: Distance between the ultrasonic sensor 33 and the object B

C: Speed of ultrasonic waves (=331+0.6F(m/s): F: Celsius temperature of ambient air measured by the temperature sensor 35)

T1: a period of time from the time when the ultrasonic sensor 32 transmits the ultrasonic waves to the time when the ultrasonic sensor 32 receives the reflected waves T2: a period of time from the time when the ultrasonic sensor 32 transmits the ultrasonic waves to the time when the ultrasonic sensor 33 receives the reflected waves Here, assuming D as a distance between the ultrasonic sensor 32 and the ultrasonic sensor 33, y and z can be described by following equations.

$$y = D/2 - (D^2 + L2^2 - L1^2)/(2 \cdot D)$$

$$z = \sqrt{\{L2^2 - (D^2 + L2^2 - L1^2)/(2 \cdot D)^2\}}$$

In the meantime, an origin of the Y-axis is positioned at the middle point between the ultrasonic sensor 32 and the ultrasonic sensor 33, which is approximately at a position of the lens of the camera 31 (a position of the optical axis C).

Further, as illustrated in FIG. 2A, the ultrasonic sensor 32 and the ultrasonic sensor 34 are arranged in a horizontal direction. By the same process as described above, by measuring periods of time T1 and T3 until the reflected waves of the ultrasonic waves transmitted from the ultrasonic sensor 32 and reflected by the object B are received by the ultrasonic sensors 32 and 34, a position x in X-axis direction and a distance z of the object B can be obtained just like triangular surveying.

In the meantime, an origin of the X-axis is positioned at a middle point between the ultrasonic sensor 32 and the ultrasonic sensor 34, which is approximately at a position of the lens of the camera 31 (a position of the optical axis C). In other words, as described above, the camera 31 and the ultrasonic sensors 32 to 34 are aligned so that the intersection of the perpendicular line extended from the middle point of the line, which connects the centers of the ultrasonic sensors 32 and 33, and the perpendicular line extended from the middle point of the line, which connects the ultrasonic sensors 32 and 34, corresponds to the optical axis C, and are located on the sensor unit 3 as a unit.

Further, an origin of the Z-axis is at a position of the ultrasonic sensor 32 to 34, which is approximately at a position of the imaging element of the camera 31.

The steering angle sensor 4 is provided at a steering wheel. The steering angle sensor 4 detects a steering angle. Then, the detected steering angle is transmitted to the control apparatus 2 as a steering angle signal. Further, the vehicle speed sensor 6 detects a vehicle speed. The detected vehicle speed is transmitted to the control apparatus 2 as a vehicle speed signal. By these, the control apparatus 2 can calculate the amount of movement of the vehicle.

Further, the display apparatus 5 is a means for displaying an image. The display apparatus 5 displays an image obtained by the camera 31, or the like, through the control apparatus 2.

The control apparatus 2 is started, for example, when a gear is shifted into reverse. The control apparatus 2 synthesizes information about an image obtained by the camera 31 and about a position of the object B obtained by the ultrasonic sensors 32 to 34, and displays on the display apparatus 5.

Figure 3:
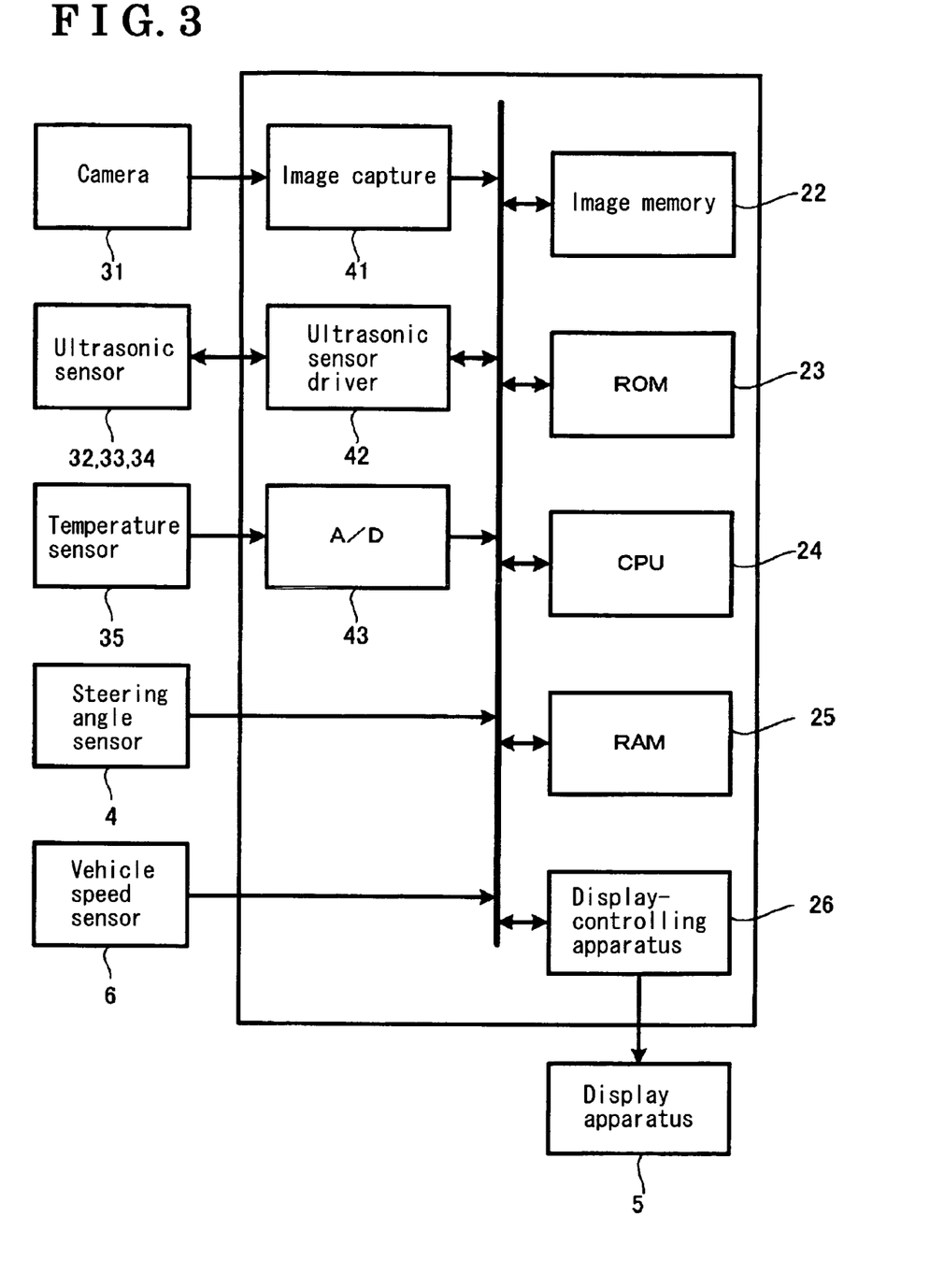
FIG. 3 represents a block diagram for explaining a configuration of a control apparatus.

As illustrated in FIG. 3, the control apparatus 2 includes an image capture 41, an ultrasonic sensor driver 42, an analog/digital (A/D) converter 43, an image memory 22, a read only memory (ROM) 23, a central processing unit (CPU) 24, a random access memory (RAM) 25 and a display-controlling apparatus 26.

The image capture 41 converts an image obtained by the camera 31 into a digital image data.

Corresponding to a command from the CPU 24, the ultrasonic sensor driver 42 applies high frequency pulse to the piezoelectric element 321 of the ultrasonic sensor 32 to transmit ultrasonic waves. At this time, the ultrasonic sensor driver 42 starts an inner timer to obtain respective periods of time T1, T2 and T3 to the time when the reflected waves are received by the ultrasonic sensors 32, 33 and 34. The obtained periods of time T1, T2 and T3 are supplied to the CPU 24.

The analog/digital (A/D) converter 43 converts a temperature signal from the temperature sensor 35 into a digital signal.

The image memory 22 memorizes the image data generated by the camera 31 and captured by the image capture 41, The CPU 24 can control and process the image data memorized in the image memory 22.

The ROM 23 memorizes a program for controlling an operation of the CPU 24. Further, the ROM 23 memorizes various fixed data for performing image processing described below.

By performing the program stored in the ROM 23, the CPU 24 displays the image obtained by the camera 31 on the display apparatus 5, detects an object (for example, an obstacle) by the ultrasonic sensors 32 to 34 and synthesizes a display indicating the object on the image.

RAM 25 functions as a work area of the CPU 24.

The display-controlling apparatus 26 controls the display apparatus 5 under the control of the CPU 24. In the meantime, the steering angle sensor 4 and the vehicle speed sensor 6 also supply measured data to the CPU 24 through buses.

Next, operations of the apparatus for monitoring surroundings of the vehicle configured and described above will be explained. First, when the gear of the vehicle is shifted into reverse, the control apparatus 2 is activated. The control apparatus 2 performs, at a constant interrupting period, a process for detecting an object (object-detecting process), illustrated in FIG. 5, as long as the gear of the vehicle 1 is in reverse. Here, the control apparatus 2 serves as an object-position-detecting means.

Figure 5:
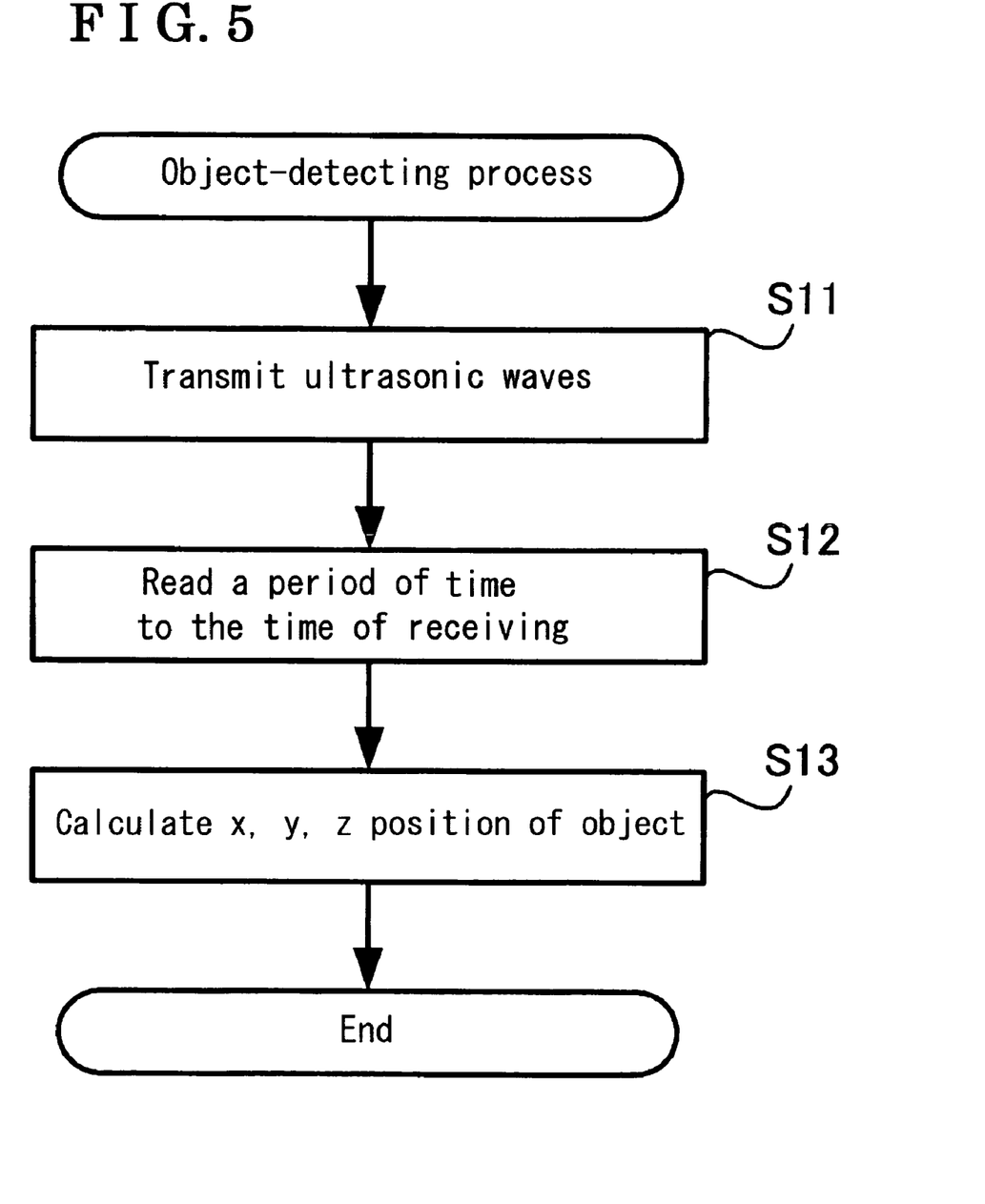
FIG. 5 represents a flow chart for explaining a process for measuring a position of an object (an obstacle)

First, the control apparatus 2 (particularly the CPU 24) controls the ultrasonic sensor driver 42 to transmit ultrasonic waves from the ultrasonic sensor 32, and at this time, starts the inner timer (Step S11). Corresponding to a command from the CPU 24, the ultrasonic sensor driver 42 supplies an oscillation signal to the ultrasonic sensor 32 to transmit ultrasonic waves and measures a period of time to the time when the ultrasonic sensor 32, 33 and 34 receive reflection, Next, the CPU 24 receives information from the ultrasonic sensor driver 42 whether each ultrasonic sensor 32 to 34 has received reflected waves. If each ultrasonic sensor 32 to 34 has received reflected waves, the CPU 24 receives information about periods of time T1 to T3 to the time when each ultrasonic sensor 32 to 34 receives the reflected waves (Step S12).

Next, the CPU 24 determines presence or absence of an object, and if an object is present, the CPU 24 determines a position of the object ((x, y, z) coordinate position) on the basis of information which indicates whether each ultrasonic sensor 32 to 34 has received reflected waves and on the basis of information which indicates periods of time T1 to T3 to the time when each ultrasonic sensor 32 to 34 receives reflected waves (Step S13), as explained above with reference to FIG. 2B.

The CPU 24 performs the process described above at regular intervals and appropriately obtains latest information about presence or absence of an object and about a position thereof.

Further, when the gear of the vehicle 1 is shifted into reverse, the control apparatus 2 commands the display apparatus 5 to end an image display which has been displayed and performs a process for displaying a rearward image of the vehicle 1 (rearward-image-displaying process). Here, the control apparatus 2 serves as a display-controlling means. The process for displaying a rearward image will be explained with reference to FIG. 6.

Figure 6:
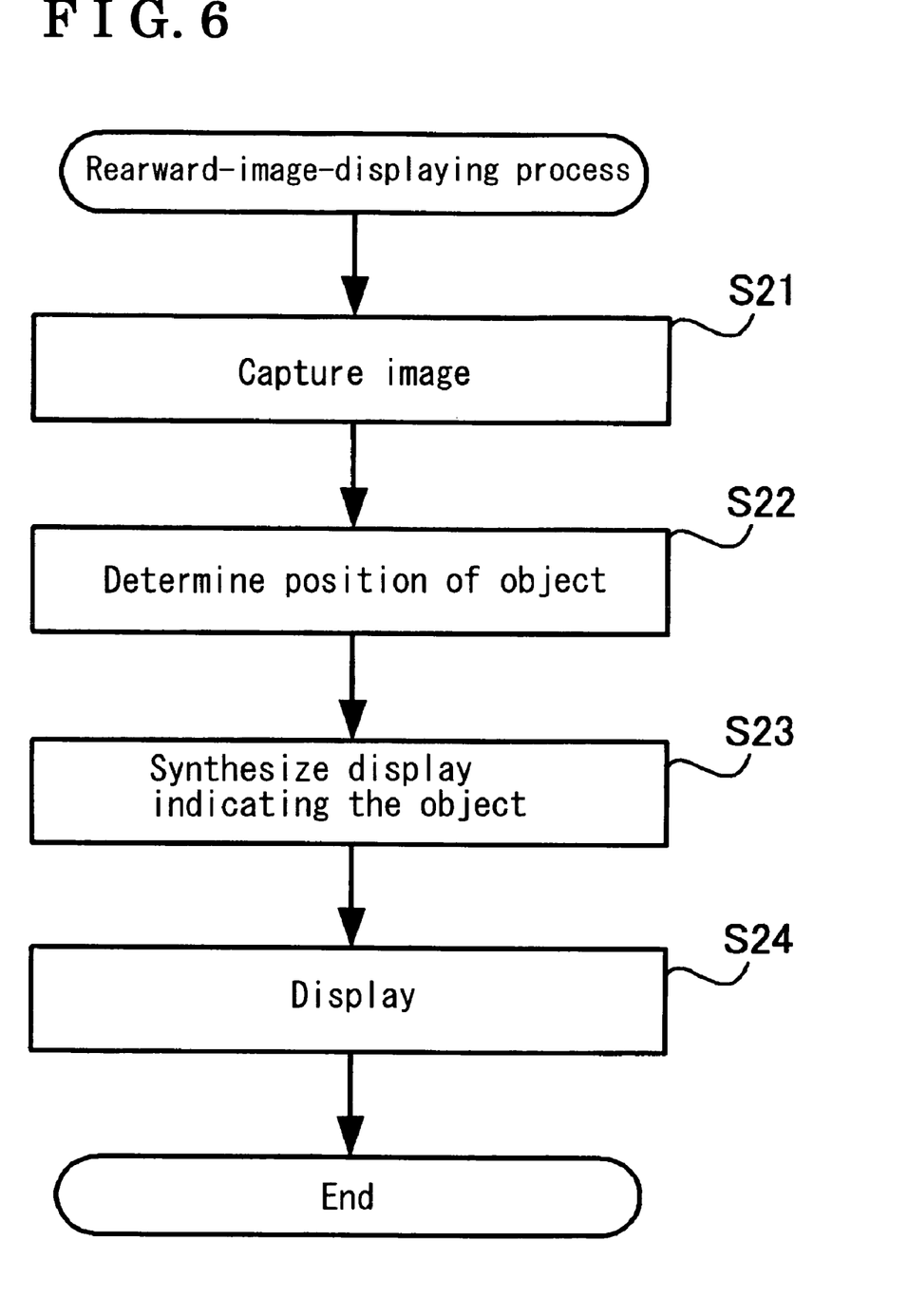
FIG. 6 represents a flow chart for explaining a rearward-image-displaying process.

First, the control apparatus 2 (particularly the CPU 24) captures the rearward image of the vehicle 1 obtained by the camera 31 through the image capture 41 and memorizes the image in the image memory 22 (Step S21).

Next, the CPU 24 determines a presence or absence of an object detected by the process for detecting an object, which is explained with reference to FIG. 5. In a situation where the object is present, the CPU 24 determines a position of the object (Step S22).

Figure 7A:
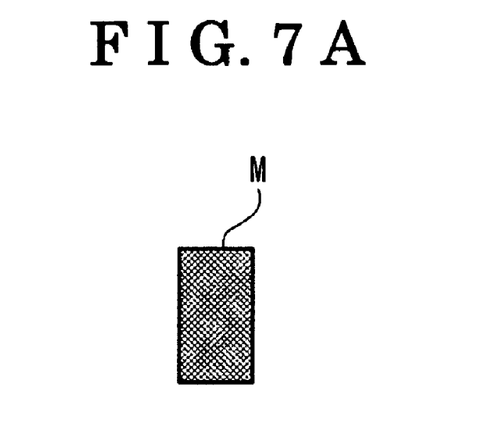
FIG. 7A represents a diagram illustrating an example of an additional mark for emphatically displaying an obstacle.
Figure 7B:
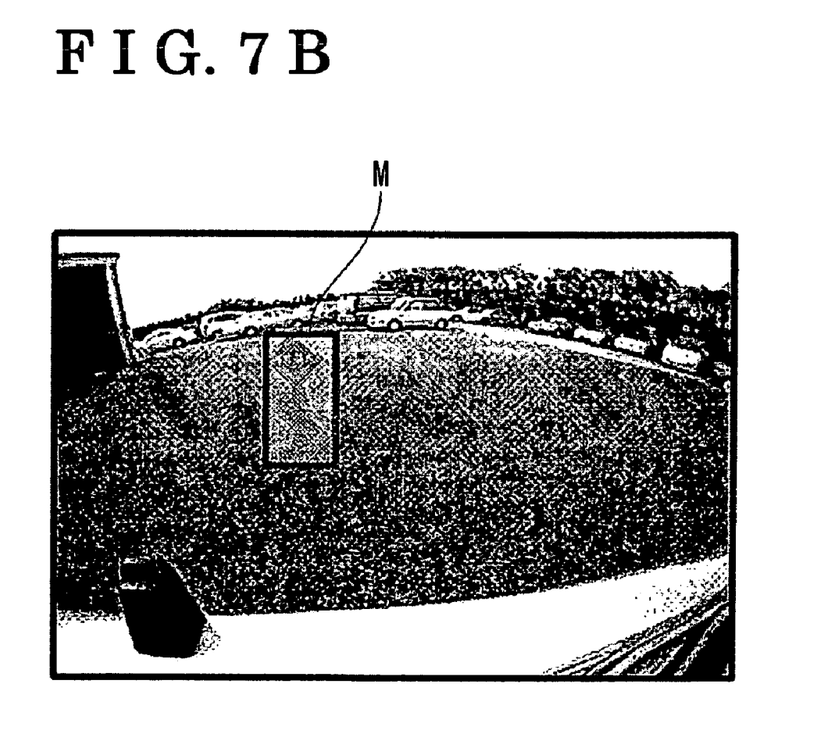
FIG. 7B represents a diagram illustrating an example of display in which an obstacle in a rearward image of the vehicle is emphatically displayed.

Further, the CPU 24 performs a predetermined image processing for an image obtained by the camera 31 at a position corresponding to the position of the object determined by the control apparatus 2. Specifically, the CPU 24 overlaps a translucent eliciting image (a predetermined image), which indicates an object (possible obstacle), for example, an image M, which is a translucent or patterned marked area with a rectangular frame as illustrated in FIG. 7A, with the rearward image obtained by the camera 31 at the (x, y) coordinate position determined by Step S13, and expands in the image memory 22 (Step S23). For example, as illustrated in FIG. 7B, a rearward image including a detected object and the image M, which emphasizes presence of the object, is generated. Here, the CPU 24 serves as an image-synthesizing means. At this time, the frame is not limited to a rectangular shape. A shape of the frame can be circular, or even polygonal.

Furthermore, at this time, origins of coordinates (optical axis position) of the image obtained by the camera 31 correspond to origins of x, y coordinates of an object obtained by the ultrasonic sensors 32 to 34. Accordingly, a particular process, such as viewpoint conversion, is not required and synthesis of the image can be easily performed.

Next, the CPU 24 displays the image memorized in the image memory 22 on the display apparatus 5 through the display-controlling apparatus 26 (Step S24).

The CPU 24 performs the process for displaying the rearward image, which is illustrated in FIG. 6, by a periodical interrupting process, or the like. Accordingly, a rearward image of the vehicle 1, which changes with time, and the eliciting image M located at a position of an object ((candidate of) obstacle), which appears in the image, are displayed on the display apparatus 5. In other words, obstacles, or the like, are emphatically displayed. Accordingly, a driver can operate a vehicle while easily distinguishing an obstacle on a screen of the display apparatus 5.

A second embodiment of the present invention will be explained. In the first embodiment described above, marks were added to images of all objects determined by the ultrasonic sensors 32 to 34 as obstacles. However, it is possible to extract an object, which becomes an obstacle for driving the vehicle, and to emphatically display the extracted object. Following, such an embodiment will be explained.

Figure 8:
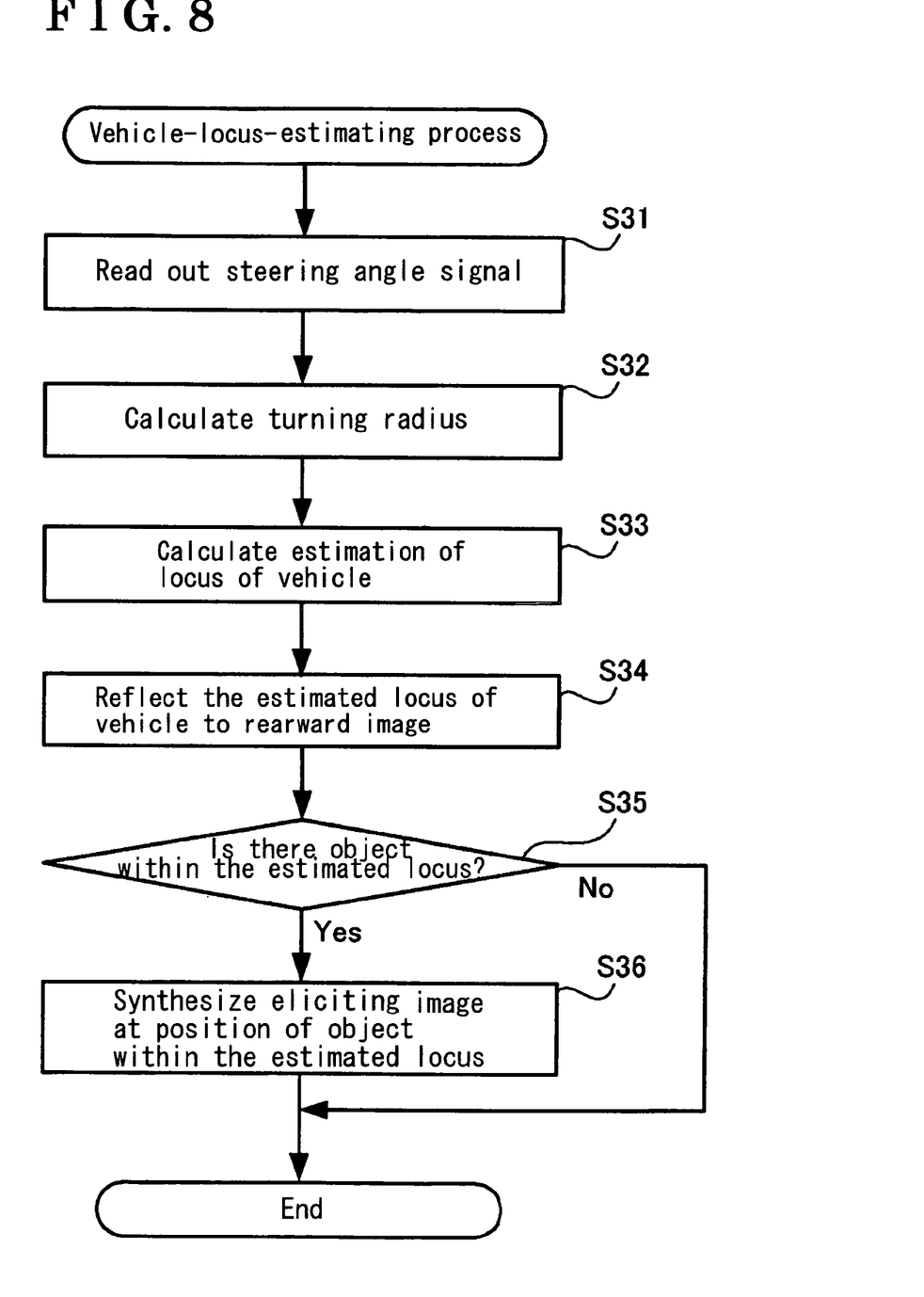
FIG. 8 represents a flow chart illustrating a process for estimating a locus of the vehicle according to a second embodiment of the present invention.

Next, the control apparatus 2 (particularly the CPU 24) periodically performs a process for estimating a locus of the vehicle (vehicle-locus-estimating process), which is illustrated in FIG. 8, by interruption from an inner timer, or the like. Here, the control apparatus 2 serves as a vehicle-locus-estimating means.

Figure 9A:
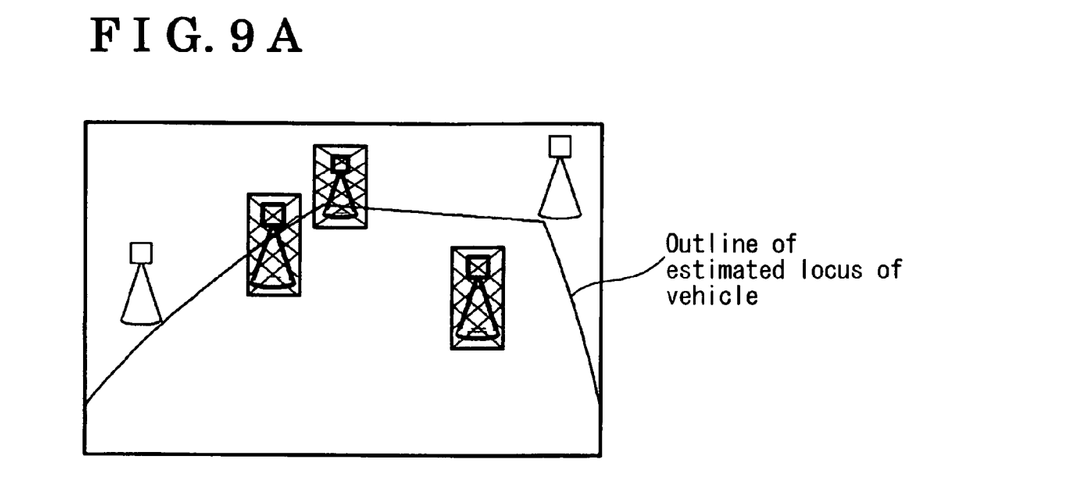
FIGS. 9A and 9B represent diagrams illustrating an example of display in which, in the rearward image of the vehicle, an estimated locus of the vehicle is displayed and an obstacle in the estimated locus is emphatically displayed.
Figure 9B:
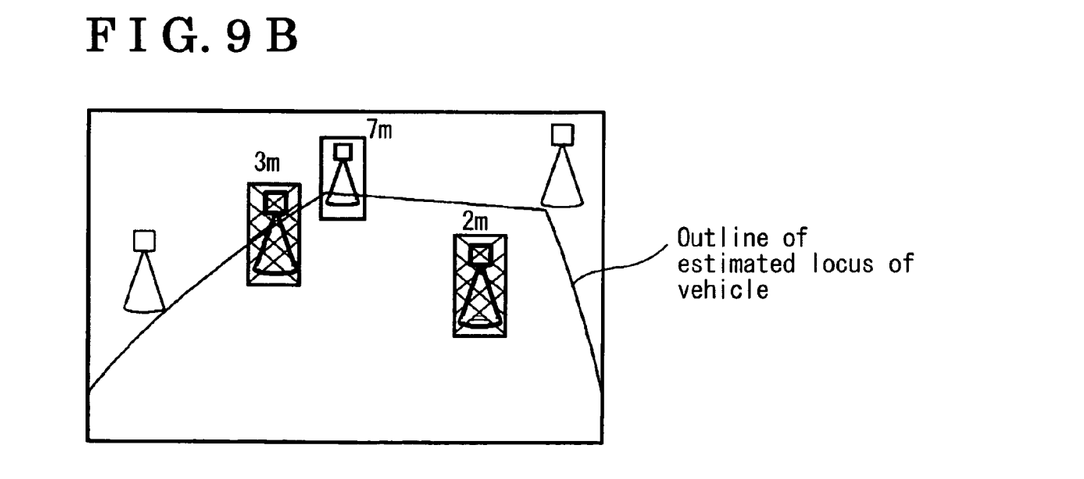

First, the control apparatus 2 (particularly the CPU 24) reads out a current steering angle signal by the steering angle sensor 4 (Step S31) and calculates a current turning radius of the vehicle 1 (Step S32). Then, the control apparatus 2 calculates (a positional data of) an estimation of the locus of the vehicle 1 from the current turning radius of the vehicle 1 (Step S33). At this time, it is considered to be obvious that a size of a cross-section of the vehicle 1, or the like, is taken into consideration. Next, the control apparatus 2 projects three-dimensionally (positional data of) the estimated locus of the vehicle on the rearward image obtained by the camera 31, which is memorized in the image memory 22 (Step S34). By this, as illustrated in FIGS. 9A and 9B as an example, a line of the estimated locus (displayed shape is not limited to a line) is displayed on the display apparatus 5.

Next, the CPU 24 grasps whether an object is present inside an outline of the estimated locus of the vehicle 1 on the basis of a result of the process of Step S13. Then, the CPU 24 determines whether an object is present inside the estimated locus of the vehicle 1 on the basis of coordinates of the estimated locus and coordinates of each object determined in Step S13 (Step S35). Specifically, for example, it is judged on whether positional data of an arbitrary object determined in Step S13 is present within a region surrounded by (positional data of) the estimated locus of the vehicle 1.

Here, in a situation where the CPU 24 judges that an object is present within the estimated locus of the vehicle 1 (S35: Yes), the CPU 24 proceeds to Step S36, performs a process for synthesizing and displaying the eliciting display (mark) M, or the like, for the image obtained by the camera 31, and goes to end.

On the other hand, in a situation where the CPU 24 judges that an object is not present within the estimated locus of the vehicle 1 (S35: No), the CPU 24 goes to end without performing the process of Step S36.

By repeating operations described above, as illustrated in FIG. 9A, the control apparatus 2 emphatically displays, on the display apparatus 5, an obstacle positioned within the estimated locus of the vehicle 1, which changes with time, and displays an object which does not become an obstacle without emphasizing it. Accordingly, a driver can drive a vehicle (backward) while easily distinguishing obstacles.

Further, as illustrated in FIG. 9B, it is possible to emphatically display a near object (an object of which a z coordinate value is smaller than a reference value) more noticeable (for example, by adding a large mark) and to emphatically display a distant object (an object of which a z coordinate is larger than the reference value) less noticeable (for example, by adding a small mark or a light mark). Further, two or more reference distances can be set. For example, it is possible to display a distance (z value) to an object (obstacle) near the mark, or the like.

Further, it is possible to feed information of a vehicle speed from the vehicle speed sensor 6, to perform a process of increasing a warning level for even more distant object in a situation where the vehicle speed is high and to perform a process of reducing a warning level in a situation where the vehicle speed is low.

The embodiment of the present invention is not limited to the embodiments described above. Various variations and applications can be made. A kind or shape of the mark, further, a method for displaying, are arbitrary. For example, the mark can be displayed to overlap with a detected object (obstacle) as described above. Or, the mark can be displayed aside of a detected object (obstacle) to accompany therewith.

Figure 10:
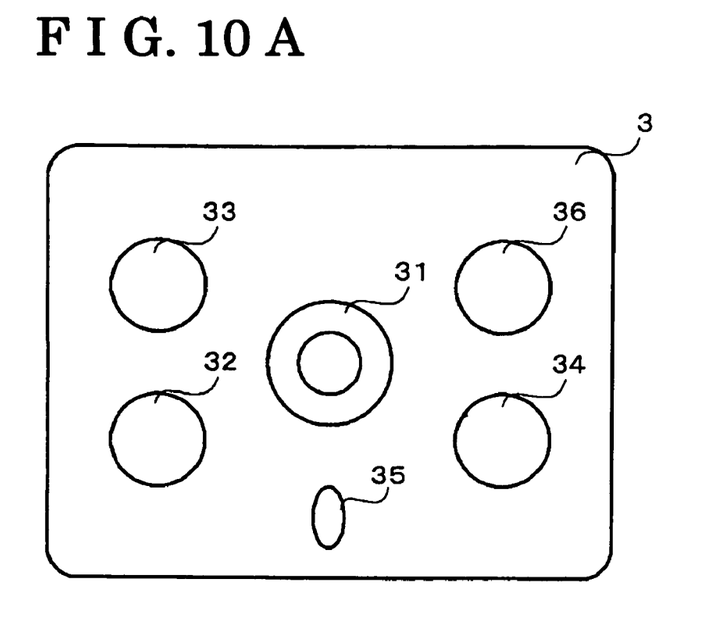
FIGS. 10A and 10B represent diagrams illustrating variations of the sensor unit.

Further, in the embodiments described above, the camera 31 and the three ultrasonic sensors 32 to 34 were located at the sensor unit 3. However, for example, as illustrated in FIG. 10A, further, a fourth ultrasonic sensor 36 can be located so that the optical axis C of the camera 31 can be located at a center, between the ultrasonic sensors 32 to 36. The fourth ultrasonic sensor 36 can be utilized to determine a position of an object more accurately. At this time, an origin of the fourth ultrasonic sensor 36 corresponds to the optical axis C of the camera 31.

Locations and positions of the ultrasonic sensors 32 to 34 are arbitrary. As illustrated in FIG. 10B, it is possible for the ultrasonic sensors to be located at top positions of an equilateral triangle, with (an optical axis C of) the camera 31 as a center. In the meantime, at least three or more ultrasonic sensors, which function as receiving elements for receiving ultrasonic waves, are required for obtaining x, y and z coordinate values. Any number of ultrasonic sensors can be utilized if only the number is three or more.

In the explanation described above, the apparatus for monitoring surroundings of the vehicle was applied to a situation for monitoring rearward when the vehicle 1 moves backward. However, the apparatus for monitoring surroundings of the vehicle can also be utilized to monitor arbitrary directions, such as a forward direction and a side direction, and can also be utilized at arbitrary timings such as at the time of normal running, at the time of stopping, and at the time of moving backward, or the like, if the sensor units 3 are located in front of the vehicle 1, at a door and at a hatchback door, or the like.

The system configuration and the flow charts described above are examples. Accordingly, variations can be arbitrarily made. For example, as the camera 31, an infrared camera, which obtains an image by far (near) infrared light, or the like, can be utilized. Further, if outputs from the ultrasonic sensors 32 to 34 are supplied to the CPU 24 through an A/D converter, it is possible for the CPU 24 to control transmission of ultrasonic waves and to measure the periods of time T1 to T3 to the time when each ultrasonic sensor 32 to 34 receives reflected waves, or the like.

For simple understanding, a center of an image obtained by the camera 31 (a position of the optical axis C) was assumed to an origin of X-Y coordinate system of the image and to an origin of X-Y coordinate system of a position of an object obtained by the ultrasonic sensors 32 to 34 and 36. However, it is not limited. A method for determining a coordinate system or an origin is arbitrary. Even in a situation in which any coordinate system or in which any standard point is selected, by locating the ultrasonic sensor 32 to 34, and 36 around or near the optical axis C of the camera 31 so as to surround the camera 31, and by making them as a unit, corresponding relation between data obtained by the unit can be positive and processes after that can be simple. Further, in the embodiments described above, an intersection of perpendicular lines, which cross middle points of lines, which connect the ultrasonic sensors 32 to 34, and 36, corresponds to the optical axis C of the camera

31. However, it is not necessary for the intersection of the perpendicular lines, which crosses the middle points of the lines, which connect the ultrasonic sensors 32 to 34, and 36, to strictly correspond to the optical axis C of the camera 31. Degree of correspondence therebetween can be appropriately set within a permissible range.

Further, it is possible to store the control apparatus program for performing processes described above by the control apparatus in the ROM through an arbitrary storage medium or network.

According to a first aspect of the present invention, an apparatus for monitoring surroundings of a vehicle includes an imaging means provided at the vehicle, a plurality of ultrasonic sensors provided around the imaging means as a unit with the imaging means, an object-position-detecting means for detecting a position of an object appearing within an imaging range of the imaging means on the basis of outputs of the plurality of the ultrasonic sensors and a display-controlling means for performing a predetermined image processing for an image obtained by the imaging means at a position corresponding to the position of the object detected by the object-position-detecting means.

According to a second aspect of the present invention, for example, the plurality of the ultrasonic sensors include at least one ultrasonic wave transmitting element and at least three ultrasonic wave receiving elements for receiving reflected waves of ultrasonic waves transmitted from the ultrasonic wave transmitting element, and the ultrasonic wave transmitting element and the ultrasonic wave receiving elements are located around an optical axis of the imaging means.

According to a third aspect of the present invention, for example, the display-controlling means includes an image-synthesizing means for synthesizing a predetermined image with the image obtained by the imaging means at the position corresponding to the position of the object detected by the object-position-detecting means.

According to a fourth aspect of the present invention, for example, the imaging means obtains an image from a moving direction of the vehicle, and the plurality of the ultrasonic sensors and the object-position-detecting means detect the position of the object in the moving direction of the vehicle. Further, according to a fifth aspect of the present invention, the apparatus for monitoring surroundings of the vehicle can further include a vehicle-locus-estimating means for estimating a locus of the vehicle when the vehicle moves, and the display-controlling means can synthesize and display the image obtained by the imaging means so as to be distinguished the object detected by the object-position-detecting means and positioned within the locus of the vehicle estimated by the vehicle-locus-estimating means from another object detected by the object-position-detecting means and positioned outside the estimated locus of the vehicle.

According to a sixth aspect of the present invention, a sensor unit includes a camera, at least one ultrasonic wave transmitting element located around an optical axis of the camera and an ultrasonic wave receiving element located around the optical axis of the camera and receiving reflected waves of ultrasonic waves transmitted from the ultrasonic wave transmitting element.

According to a seventh aspect of the present invention, in the apparatus for monitoring surroundings of the vehicle according to the first aspect of the present invention, the plurality of the ultrasonic sensors comprises a first ultrasonic sensor and a second ultrasonic sensor arranged in parallel with each other and the imaging means is provided on a line extended from a middle point between the first ultrasonic sensor and the second ultrasonic sensor, the line perpendicular to a line which connects the first ultrasonic sensor and the second ultrasonic sensor.

According to an eighth aspect of the present invention, in the apparatus for monitoring surroundings of the vehicle according to the seventh aspect of the present invention, the plurality of the ultrasonic sensors further comprises a third ultrasonic sensor arranged in parallel with the first ultrasonic sensor and the imaging means is provided on a line extended from a middle point between the first ultrasonic sensor and the third ultrasonic sensor, the line perpendicular to a line which connects the fast ultrasonic sensor and the third ultrasonic sensor.

According to a ninth aspect of the present invention, in the sensor unit according to the sixth aspect, the number of the ultrasonic wave receiving elements is three and each ultrasonic wave receiving element is provided equidistantly from the camera.

According to a tenth aspect of the present invention, in the sensor unit according to the ninth aspect, a temperature sensor is provided on a plane on which the camera, the ultrasonic wave transmitting element and the ultrasonic wave receiving elements are provided.

According to the aspects described above, the ultrasonic sensors are located around the imaging means. Accordingly, a center of view of the imaging means can approximately correspond to a center of a space in which the object-position-detecting means detects an object. Accordingly; it can be easily judged where a position of a detected object on the image obtained by the imaging means is, and as required basis, the position of the detected object can be reflected on the image.

The principles, preferred embodiment and mode of operation of the present invention, have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An apparatus for monitoring surroundings of a vehicle, comprising:
    an imaging means provided at the vehicle;
    a plurality of ultrasonic sensors provided around the imaging means as a unit with the imaging means;
    an object-position-detecting means for detecting a position of an object appearing within an imaging range of the imaging means on the basis of outputs of the plurality of the ultrasonic sensors; and
    a display-controlling means for performing a predetermined image processing for an image obtained by the imaging means at a position corresponding to the position of the object detected by the object-position-detecting means.

2. The apparatus for monitoring surroundings of the vehicle according to claim 1, wherein
    the plurality of the ultrasonic sensors comprise at least one ultrasonic wave transmitting element and at least three ultrasonic wave receiving elements for receiving reflected waves of ultrasonic waves transmitted from the ultrasonic wave transmitting element, and the ultrasonic wave transmitting element and the ultrasonic wave receiving elements are located around an optical axis of the imaging means.

3. The apparatus for monitoring surroundings of the vehicle according to claim 1, wherein
the display-controlling means comprises an image-synthesizing means for synthesizing a predetermined image with the image obtained by the imaging means at the position corresponding to the position of the object detected by the object-position-detecting means.

4. The apparatus for monitoring surroundings of the vehicle according to claim 1, wherein
the imaging means obtains an image from a moving direction of the vehicle, and the plurality of the ultrasonic sensors and the object-position-detecting means detect the position of the object in the moving direction of the vehicle.

5. The apparatus for monitoring surroundings of the vehicle according to claim 1, further comprising a vehicle-locus-estimating means for estimating a locus of the vehicle when the vehicle moves, wherein
the display-controlling means processes the image obtained by the imaging means so as to be distinguished the object detected by the object-position-detecting means and positioned within the locus of the vehicle estimated by the vehicle-locus-estimating means from another object detected by the object-position-detecting means and positioned outside the estimated locus of the vehicle.

6. A sensor unit, comprising:
a camera;
at least one ultrasonic wave transmitting element located around an optical axis of the camera; and
at least three an ultrasonic wave receiving elements located around the optical axis of the camera and receiving reflected waves of ultrasonic waves transmitted from the ultrasonic wave transmitting element.

7. The apparatus for monitoring surroundings of the vehicle according to claim 1, wherein
the plurality of the ultrasonic sensors comprises a first ultrasonic sensor and a second ultrasonic sensor arranged in parallel with each other and the imaging means is provided on a line extended from a middle point between the first ultrasonic sensor and the second ultrasonic sensor, the line perpendicular to a line which connects the first ultrasonic sensor and the second ultrasonic sensor.

8. The apparatus for monitoring surroundings of the vehicle according to claim 7, wherein
the plurality of the ultrasonic sensors further comprises a third ultrasonic sensor arranged in parallel with the first ultrasonic sensor and the imaging means is provided on a line extended from a middle point between the first ultrasonic sensor and the third ultrasonic sensor, the line perpendicular to a line which connects the first ultrasonic sensor and the third ultrasonic sensor.

9. The sensor unit according to claim 6, wherein
the number of the ultrasonic wave receiving elements is three and each ultrasonic wave receiving element is provided equidistantly from the camera.

10. The sensor unit according to claim 9, wherein
a temperature sensor is provided on a plane on which the camera, the ultrasonic wave transmitting element and the ultrasonic wave receiving elements are provided.

11. The sensor unit according to claim 6, wherein the sensor unit is used in an apparatus for monitoring surroundings of a vehicle.

12. The sensor unit according to claim 6, wherein a first ultrasonic wave receiving element and a second ultrasonic wave receiving element arranged in parallel with each other and the camera is provided on a line extended from a middle point between the first ultrasonic wave receiving element and the second ultrasonic wave receiving element, the line perpendicular to a line which connects the first ultrasonic wave receiving element and the second ultrasonic wave receiving element.

13. The sensor unit according to claim 12, wherein the sensor unit further comprises a third ultrasonic wave receiving element arranged in parallel with the first ultrasonic wave receiving element and the camera is provided on a line extended from a middle point between the first ultrasonic wave receiving element and the third ultrasonic wave receiving element, the line perpendicular to a line which connects the first ultrasonic wave receiving element and the third ultrasonic wave receiving element.

* * * * *